United States Patent
Mastromatteo et al.

(10) Patent No.: US 6,759,132 B2
(45) Date of Patent: Jul. 6, 2004

(54) METHOD FOR THE MANUFACTURE OF ELECTROMAGNETIC RADIATION REFLECTING DEVICES

(75) Inventors: Ubaldo Mastromatteo, Bareggio (IT); Pietro Corona, Roma (IT); Flavio Villa, Milan (IT); Gabriele Barlocchi, Cornaredo (IT)

(73) Assignee: STMicroelectronics S.R.L., Milan (IT)

( * ) Notice: Subject to any disclaimer, the term of this patent is extended or adjusted under 35 U.S.C. 154(b) by 0 days.

(21) Appl. No.: 10/295,767

(22) Filed: Nov. 14, 2002

(65) Prior Publication Data

US 2003/0129423 A1 Jul. 10, 2003

(30) Foreign Application Priority Data

Nov. 14, 2001 (EP) .............................. 01830701

(51) Int. Cl.[7] .............................. B32B 9/00; B32B 7/00
(52) U.S. Cl. ....................... 428/446; 428/450; 428/689; 428/620
(58) Field of Search ................. 428/446, 450, 428/689, 698, 620

(56) References Cited

U.S. PATENT DOCUMENTS

| | | | | |
|---|---|---|---|---|
| 4,780,372 A | * | 10/1988 | Tracy et al. | 428/428 |
| 5,629,790 A | | 5/1997 | Neukermans et al. | |
| 5,719,846 A | | 2/1998 | Matoba et al. | |
| 6,417,107 B1 | * | 7/2002 | Sekimura | 438/689 |
| 2002/0134749 A1 | * | 9/2002 | Cho | 216/24 |

FOREIGN PATENT DOCUMENTS

| GB | 2275787 | 7/1994 |
|---|---|---|

OTHER PUBLICATIONS

European Search Report.

Masayuki Sekimura, "Anisotropic Etching of Surfactant–Added Tmah Solution", Micro Electo Mechanical Systems, 1999, Twelfth IEEE International Conference in Orlando, Florida, pp. 650–655.

Ernest Bassous "Fabrication of Novel Three–Dimensional Microstructures by the Anisotropic Etching of (100) and (110) Silicon", IEEE Transactions on Electron Devices, vol. ED 25. No. 10 Oct. 1978, pp. 1178–1185.

Kyoung–Sun Seo et al. "Tunable Micromirror Switches Using (110) Silicon Wafer" Seventh International Symposium on Micro Machine and Human Science, pp. 73–77.

(List continued on next page.)

*Primary Examiner*—Stephen Stein
(74) *Attorney, Agent, or Firm*—Graybeal Jackson Haley LLP (57) ABSTRACT

Method for manufacturing electromagnetic radiation reflecting devices, said method comprising the steps of: a) providing a silicon substrate defined by at least one first free surface, b) forming on said first surface a layer of protective material provided with an opening which exposes a region of the first free surface, and c)etching the region of the free surface by means of an anisotropic agent to remove at least one portion of the substrate and define a second free surface of the substrate inclined in relation to said first surface. Furthermore, said first free surface is parallel to the crystalline planes {110} of silicon substrate and said step (c) comprises a progressing step of the anisotropic agent such that the second free surface resulting from the etching step is parallel to the planes {100} of said substrate.

6 Claims, 5 Drawing Sheets

OTHER PUBLICATIONS

L. Smith et al. "Silicon Micromachined (2×2) Opto Coupler", Optical Interconnections and Networks 1990, SPIE vol. 1281.

Carola Strandman et al. "Fabrication of 45° Mirrors Together with Well–Defined V–Grooves Using Wet Anisotropic Etching of Silicon" Journal of Microelectromechanical Systems, Dec. 1995, No. 4.

Yuji Uenishi et al. "Micro–opto–mechanical Devices Fabricated by Anisotropic Etching of (110) Silicon" Journal of Micromechanics & Micorengineering, vol. 5, 1995.

Ylva Backlund "New Shapes in (100) Si Using KOH and EDP Etches" Journal of Micromechanics & Microengineering, vol. 2, No. 2, Jun. 1992.

L. Rosengren et al. "Micromachined Optical Planes and Reflectors in Silicon" Sensors and Actuators, Apr. 1, 1994, Nos. 1/3.

* cited by examiner

METHOD FOR THE MANUFACTURE OF ELECTROMAGNETIC RADIATION REFLECTING DEVICES

PRIORITY CLAIM

The present application claims priority from European patent Application No. 01830701.7, filed Nov. 14, 2001, which is incorporated by reference.

FIELD OF THE INVENTION

The present invention refers generally to methods for the manufacture of electromagnetic radiation reflecting devices. In particular, one embodiment of the invention refers to the fabrication of reflecting devices comprising silicon substrates provided with a wall having the function of a mirror and usable, for example, in the photonic field.

BACKGROUND OF THE INVENTION

As is known, reflecting devices, hereinafter called mirrors, are used to deflect a beam of incident radiation, or light, at an appropriate angle.

For example, in the field of telecommunications, mirrors are used as an interface between optical fibers and transmitting/receiving devices. According to a known fabrication method, the optical fiber is inserted into a silicon substrate and one end of the fiber, suitably cut and polished, is covered with a layer of reflecting aluminum inclined at 45° in relation to the fiber axis.

This mirror placed at the end of the fiber deflects the light beam by 90° which, after passing through a suitable glass covering element, reaches, for example, a photo-detector. Several optical fibers can be inserted into the substrate in U-grooves obtained by means of mechanical micro-machining of the substrate itself. Typically, the grooves have one side of 125 µm and a pitch of 250 µm.

In another application, the mirrors are used to deflect (typically by 90°) the light emitted by a laser source to hit an Optical Compact Disc (OCD) in a reading process.

A conventional method for manufacturing mirrors used for OCDs comprises the steps of micro-machining glass bars in order to form a mirror wall, followed by a welding operation of said bars on to silicon wafers used for the correct alignment of the devices.

The methods based on micro-machining of substrates or silicon bars are both complex and costly, so research into alternative methods is attractive.

In the article "Fabrication of 45° Optical Mirrors on <100> Silicon Using Surfactant-added TMAH Solution" M. Semikura and H. Naruse, Transducer '99; Jun. 7–10, 1999, Sendai Japan, a mirror fabrication method is described in which the silicon support is etched chemically by an anisotropic agent. According to this method, the silicon support has an orientation of <100> and is etched, through a suitable oxide mask formed on its external surface, with a solution (at a temperature of 90° C.) containing the anisotropic agent Tetramethylammonium Hydroxide (TMAH) to which a surfactant has been added. The TMAH agent cuts into the silicon substrate <100> giving rise to free parallel walls with crystalline planes {110}. According to the authors, this chemical etching makes it possible to obtain a wall parallel to the planes {110 and, therefore, inclined at 45° in relation to the external surface of the substrate <100>.

The authors of the article report that they obtained, with the above-mentioned method, walls at 45° having a root-mean-square of roughness equal to 50 nm and peak-to-valley values of around 200 nm.

It should be noted that these roughness values make the method proposed in the article unsuitable for the production of mirrors destined for photonic applications, such as those mentioned as an example above. In fact, this type of application necessitates a reflection quality higher than that obtainable with mirror walls having the roughness indicated in the article.

SUMMARY OF THE INVENTION

An embodiment of the present invention is to propose a method for manufacturing reflecting devices which overcomes the limits and disadvantages of the methods described above with reference to the known art.

Other embodiments of the invention include a device for the reflection of electromagnetic radiation and a system using a device for the reflection of electromagnetic radiation.

BRIEF DESCRIPTION OF THE DRAWINGS

The characteristics and advantages of this invention will be better understood by reading the following detailed description of a non-limiting example of the embodiment, illustrated in the enclosed drawings, where.

DETAILED DESCRIPTION OF THE INVENTION

With reference to FIGS. 1a–3c, an example of a method for manufacturing a reflecting device will be described according to an embodiment of the invention.

The particular method described refers to the fabrication of a device having at least two reflecting surfaces, or mirror walls, such as to be used in an optical system, for example a system for reading optical compact discs (OCD). Obviously, one of skill in the art, on the basis of the following description, can adapt this method to the manufacture of reflecting devices suitable for other applications.

Figure 1A:
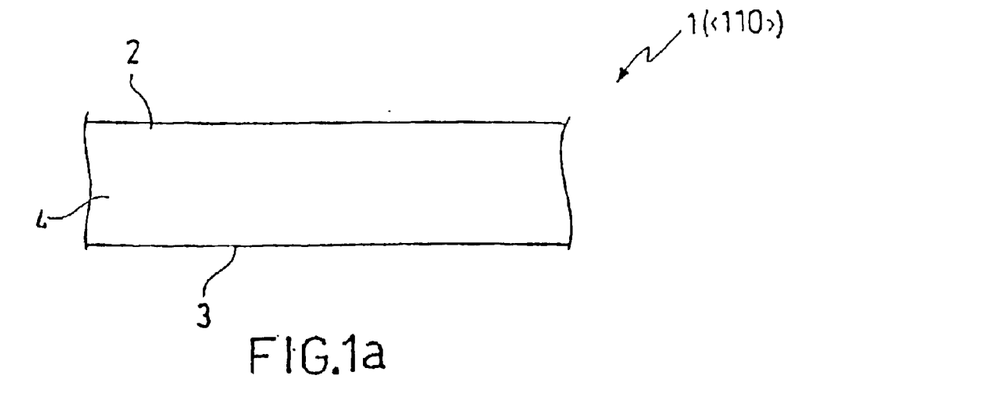
FIGS. 1a, 1b, 1c show different manufacturing steps of a reflecting device according to a method in accordance with an embodiment of the invention.
Figure 1B:
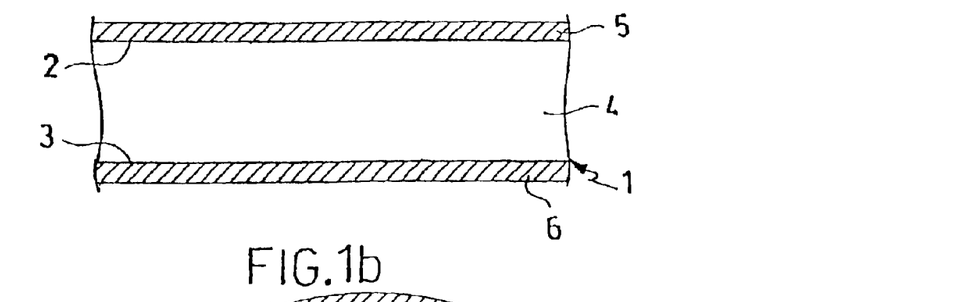

FIG. 1a shows the lateral view of a cross-section of a substrate or wafer of silicon 1 of the <110> type, having an upper external (or free) surface 2 and an opposing lower external (or free) surface 3. As is known, a substrate of silicon type <110>, i.e. with orientation <110>, is cut in such a way that the major external surfaces, such as the surfaces 2 and 3, are parallel to the crystalline planes {110} of the substrate.

Advantageously, the substrate 1 has a flat side 4 at right angles to the upper free surface 2 and such as to be parallel to the crystalline planes {110}. The flat side 4 constitutes a reference plane which makes it possible to correctly orient the silicon substrate 1.

The method described in this example provides for the formation of a mask on each of the free surfaces 2 and 3 using, for example, known photolithographic techniques.

In greater detail, the creation of masks comprises a step of forming, on the free surfaces 2 and 3 respectively, an upper layer of protective material 5 and a lower one 6 (FIG. 1b), obtainable by conventional techniques. Preferably, each of the layers 5 and 6 is made in plasma oxynitride or is composed of a first layer in silicon dioxide, in contact with the substrate 1, and a second layer, placed over the first, in silicon nitride. A favorable combination for the thickness of the silicon dioxide and silicon nitride is 1300 A° and 2800 A° respectively.

Then, an upper opening 7 and a lower opening 8 (FIG. 2) are created in the protective layers 5 and 6 respectively.

Formation of the openings 7 and 8 can be carried out by one of skill in the art using photo-resist layers, masks, exposure to ultraviolet radiation and washing in a development solution.

Figure 1C:
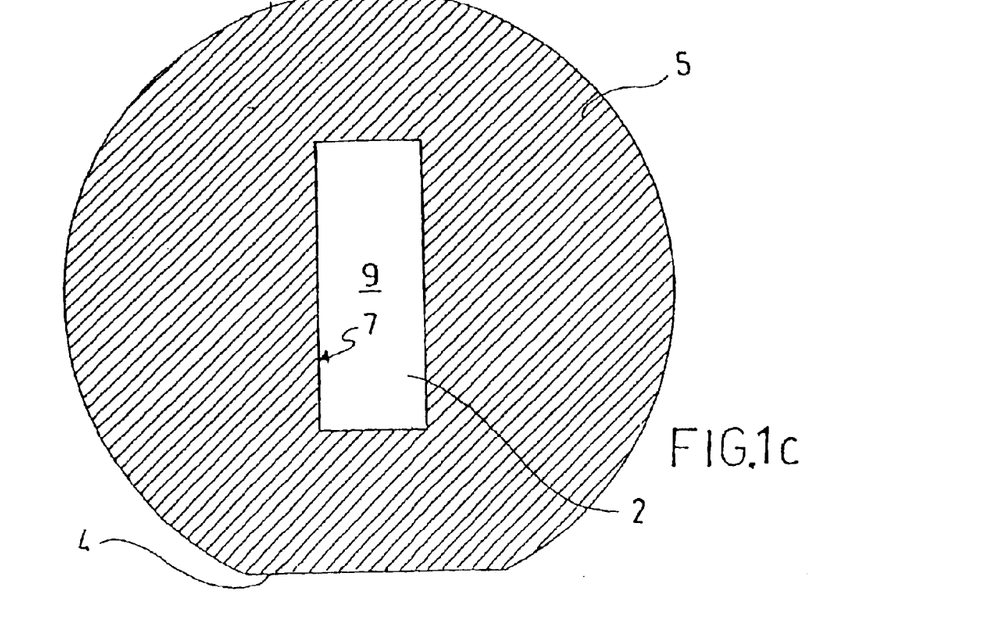

FIG. 1c represents a view from above of the substrate 1 and shows an upper opening 7, having a rectangular shape.

Figure 2:
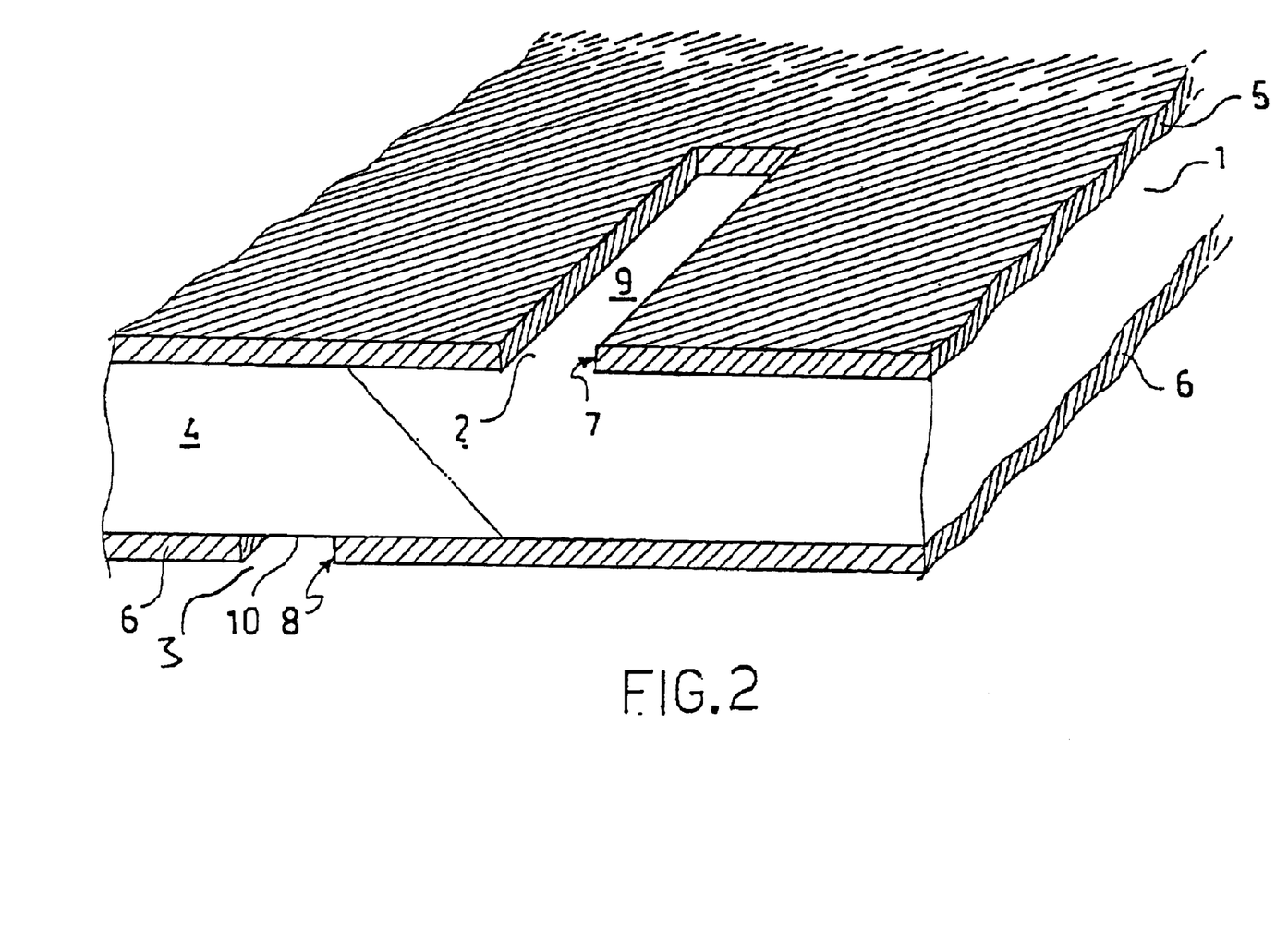
FIG. 2 shows another manufacturing step of said device in accordance with an embodiment of the invention.

FIG. 2 gives a perspective view of a portion of the substrate 1 (sectioned according to a plane parallel to the flat side 4) provided with the layers of protective material 5 and 6 and where the opening 7 and the opening 8, for example also rectangular in shape, are indicated respectively.

Advantageously, the openings 7 and 8 are oriented in such a way as to be aligned with the flat side 4 or, in other words, so as to have edges parallel and edges at right angles to the flat side 4 having an orientation {110}. The openings 7 and 8 define, on the upper and lower surfaces 2 and 3, an upper etching region 9 and a lower etching region 10 (not visible in FIG. 2). After the formation of the openings 7 and 8, this method provides for a chemical etching step on the substrate 1 and, in particular, on the upper 9 and lower 10 regions exposed by the openings 7 and 8.

During this etching step, the substrate 1 is immersed in an anisotropic agent suitable to cut into the substrate 1 proceeding in such a way as to form at least one wall, i.e. a free surface, which is parallel to the crystalline planes {100} of said substrate 1. In particular, for the substrate 1 of the <110> type, said wall resulting from the etching is inclined at a value substantially equal to 45° in relation to the surface from which the chemical etching occurred. It should be remembered that the crystalline planes {110} of the silicon are inclined at 45° in relation to the planes {100}, and vice-versa.

According to the example described, from the upper etching region 9, the anisotropic agent causes the removal of a first portion 11 of the substrate 1. The first portion 11 is defined, in the view given in FIG. 3a, by the planes 13 and 14 parallel to the crystalline planes {100} and, therefore, inclined substantially at 45° in relation to said upper region 9.

Figure 3A:
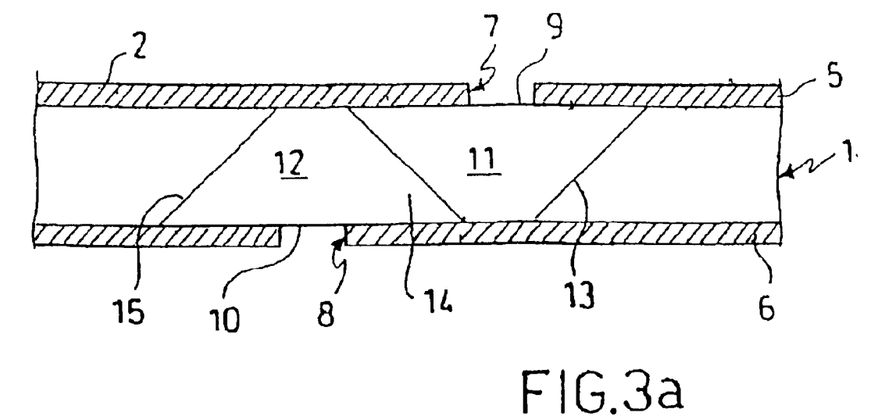
FIGS. 3a, 3b, 3c, show the conclusive manufacturing steps of said device in accordance with an embodiment of the invention.

Similarly, the anisotropic agent which acts through the lower opening 8 removes a second portion 12 of the substrate 1 defined, in the view given in FIG. 3a, by the plane 14 and by a plane 15, both inclined substantially at 45° in relation to the surface of the lower etching region 10.

It should be observed that etching by the anisotropic agent proceeds in the silicon substrate 1 to the same extent both in depth, i.e. perpendicularly to the exposed surfaces 2 and 3, and laterally, i.e. below the protective layers 5 and 6. At the end of etching, portions of the protective layers 5 and 6 near the openings 7 and 8 remain projecting over the hollow regions of the substrate 1 which result from the removal of the portions 11 and 12.

Considering that the anisotropic agent will act in this way, one of skill in the art can easily determine the geometry and relative arrangement of the openings 7 and 8 in such a way as to obtain the desired free walls at the end of etching.

Furthermore, it should be noted that the protective layers 5 and 6 made with the materials and with the thickness given above by way of an example, have a hardness such as to remain intact until the end of etching.

The anisotropic agent which can be used in the method according to the invention is, for example, an aqueous solution of an active compound of a type known in the field of silicon micro-manufacturing. In particular, alkaline solutions can be used where the active compound is, preferably, Tetramethylammonium Hydroxide, (TMAH), potassium hydroxide, (KOH), or sodium hydroxide, (NaOH). A mixture known as EDP, composed of ethyldiamine, pyrocatechin and water, can also be used as an anisotropic agent. According to one embodiment of the invention, the alkaline solution has a concentration of the active compound between 6% and 25% (in weight). In yet another embodiment said concentration is between 8% and 20%. In another embodiment, values of said concentration are between 10% and 15%.

Furthermore, during etching, the temperature of the solution which constitutes the anisotropic agent is, according to one embodiment, between 30° C. and 70° C. In another embodiment, said temperature is between 40° C. and 65° C. In yet another embodiment, values of the temperature are between 50° C. and 60° C.

After etching, the method provides for a step of removing the protective layers 5 and 6, performed, for example, with hydrofluoric acid followed by washing in water, according to methods known in the art.

Figure 3B:
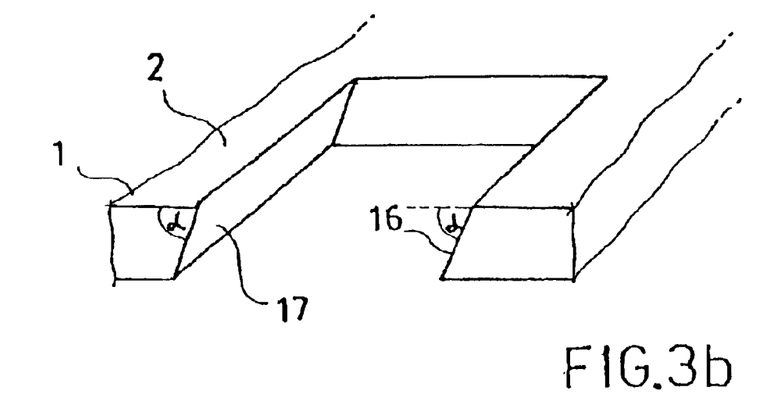

FIG. 3b, shows a section of the substrate 1 resulting at the end of the removal step of the protective layers 5 and 6. The substrate 1 obtained with the above-described method is provided with a first free or external wall 16 and a second free or external wall 17 coinciding with the planes 13 and 15 respectively, shown in FIG. 3a. Said external walls 16 and 17 are connected to the upper surface 2 of the substrate 1 and with this they form angles α substantially equal to 45°.

Figure 3C:
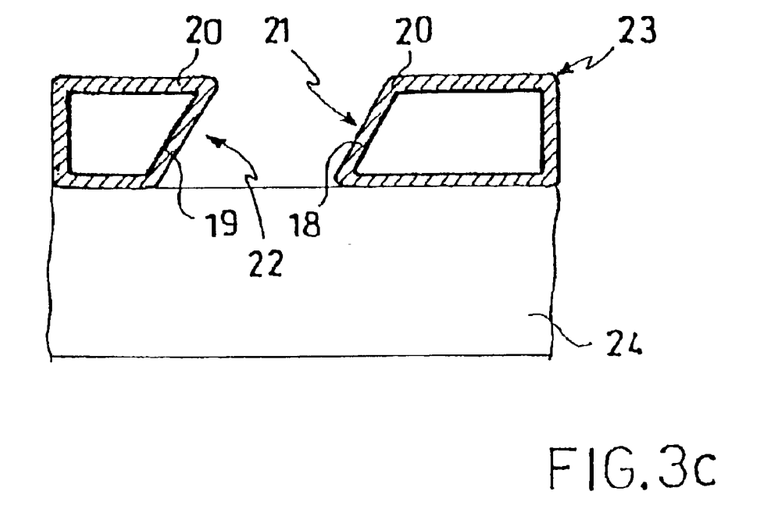

Furthermore, with reference to FIG. 3c, the method comprises a covering step of the first and of the second external walls 16 and 17 with one or more layers of material suitable to reflect electromagnetic radiation at the desired wavelengths. In particular, the covering step comprises a metallization step of the walls 16 and 17 (or at least a portion of the surface of the substrate 1), with a respective layer of metal 18 and 19 suitable to reflect radiation at optical wavelengths. For example, aluminum, gold, or silver can be deposited with conventional techniques such as vapor phase deposition or sputtering.

Moreover, after metallization, a step to deposit on the metallic layers 18 and 19, or even on portions of the substrate 1, respective protective layers 20 of silicon dioxide with the aim to avoid oxidation of the underlying metallic layers is performed according to an embodiment of the invention. Said protective layers 20 will be transparent for the radiation to be reflected.

The above-described method has led to the fabrication of a reflecting device 23 provided with mirror walls 21 and 22 comprising the walls 16 and 17 (FIG. 3b) covered, respectively, with metallic layers 18 and 19 and with silicon dioxide 20.

Said device 23 can be fixed to a silicon support substrate 24, for example, a substrate with orientation <100>, by means of conventional techniques such as welding or bonding.

It should be noted that the fabrication method according to the above-described embodiment of the invention is particularly advantageous because it is not complex and makes it possible to obtain reflecting devices with a higher quality than those devices obtainable with conventional methods.

According to another embodiment of the invention, a reflecting device can be produced using the above-described method or a similar method. In particular, a silicon substrate of the <100> type can be used with a thickness of approximately 400 μm (and as anisotropic agent, an aqueous solution of 12% TMAH can be used, at a temperature of approximately 55° C.).

Moreover, it should be noted that the solution may not have added surfactants which are often used according to the known art.

The protective layers 5 and 6, in which the openings 7 and 8 are made, can be produced with a first layer in silicon dioxide and a second layer in silicon nitride having the above-mentioned thickness.

During the etching step, the substrate 1 is immersed for a period of time equal to about 37 hours in the anisotropic agent consisting of a conditioned and recycled solution.

Furthermore, the inclination and roughness of the external walls, parallel to the substrate 1 crystalline planes {100}, obtained after chemical etching such as, for example walls 16 and 17 of FIG. 3b, can be measured.

For one device, an inclination α of 45° C. with a deviation contained within 10', α=45°+/−10' was measured. Said inclination values are compatible with the use of the reflecting device within the field of optical telecommunications for OCD reading.

Moreover, the walls of this device had a roughness on the order of angstroms.

It should be observed that said roughness values are considerably lower than those (of about 50 nm) observed on the walls parallel to the crystalline planes {110} obtained by substrates of the <100> type, according to conventional manufacturing methods.

It was observed that the quality of the walls obtainable by chemical etching can be linked to the speed with which etching takes place. In particular, it is reasonable to assume that the quality of the walls resulting from etching increases as the speed with which etching takes place decreases.

On the basis of this consideration, a possible explanation of the results obtained can be found in the fact that chemical etching along the crystalline plane {100} of a substrate with orientation <110>, according to embodiments of the invention, takes place slowly. Furthermore, particularly advantageous etching conditions are those which can be obtained with the active compounds, the concentrations and the temperatures given as examples above.

For example, an etching speed equal to about 10 μm/h (substantially corresponding to an incision of 400 μm in 40 h), such as that obtained experimentally, can be considered a sufficiently slow speed for the quality of the result, etching times remaining however acceptable. A maximum etching speed value, in other words, a value above which a decrease in the quality of etching is considered possible, is, for example, equal to about 20 μm/h, i.e. equal to about double the value given above as satisfactory.

It was also observed that the low quality, in terms of roughness of the chemical etching, carried out according to known methods, might be attributable also to the presence of surfactants which, however, can be avoided as discussed above according to an embodiment of the present invention.

The silicon substrate 1 can, for example, be doped, preferably with P-type dopants. In particular, boron can be used as a dopant with a concentration, for example, of between $10^{14}$ and $10^{18}$ cm$^{-3}$. For concentration values within this range, a noticeable change in etching speed does not take place, while with concentrations between $10^{19-1020}$ cm$^{-3}$, a reduction in etching speed, compared to that obtainable with intrinsic silicon, takes place. In particular, for a boron concentration value substantially equal to $4 \cdot 10^{20}$, a reduction of about 1/40 in the etching speed of intrinsic silicon takes place.

The reflecting device 23 of FIG. 3c can be used in various types of optical systems.

Figure 4:
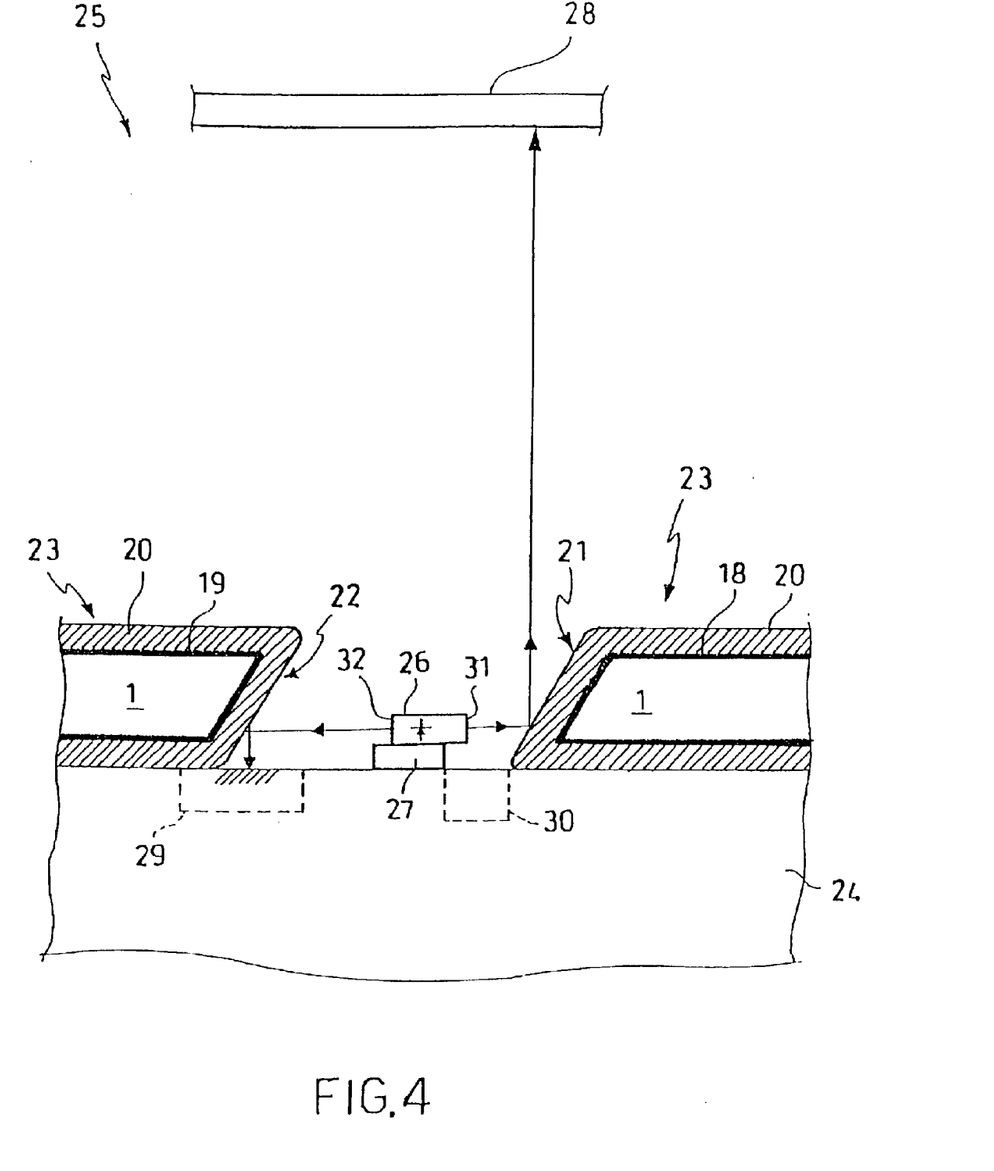
FIG. 4 shows a first embodiment of a system using a first reflecting device obtainable with the method of FIGS. 1a,–1c, 2, 3a–3c in accordance with an embodiment of the invention.

FIG. 4 shows an example of a first optical system 25 comprising the reflecting device 23, the support substrate 24, a laser source, such as a semiconductor laser 26 and an optical disc 28. It should be noted that in FIGS. 4 and 5, the same numerical references are used to indicate identical or similar components.

The semiconductor laser 26 is fixed to the support layer 24 by means of an element 27 which ensures optical alignment to the device 23. For example, the element 27 can be made in silicon carbide to allow dissipation of the heat generated during laser operation. Furthermore, electrical connection means are provided (not shown), such as bonding wires, of the laser 26 to integrated circuits placed in the support substrate 24.

The laser 26 is arranged in such a way that its output ports 31 and 32 are optically coupled with the mirror walls 21 and 22 of the device 23.

In the support substrate 24, an optical signal detection circuit 29 (such as a photodiode) and a control circuitry 30 of the laser 26 are inserted. For example, the control circuitry 30 is arranged, in the substrate 24, laterally to the support region of the element 27, in such a way as not to be damaged by the latter.

During operation of the optical system 25, the optical beam output by port 31 of the laser 26 hits the mirror wall 21 of the device 23. The mirror wall 21, inclined at 45° in relation to the propagation direction of the optical beam, deflects the optical beam by an angle substantially equal to 90° so that this can hit the optical disc 28. The back-scattered optical beam of the laser 26 coming from the output port 32 is conveyed, by means of reflection on the mirror wall 22, towards the photodiode 29 which converts it into a detected electrical signal. Said detected electrical signal is then fed to the control circuitry 30 which generates drive signals of the laser 26.

It should be observed that, thanks to the use of a reflecting device 23 manufactured according to an embodiment of the invention, the reflections of the optical beam on the mirror walls 21 and 22 take place with a precision which is adequate for the quality required in optical disc reading/writing systems, OCD.

Figure 5:
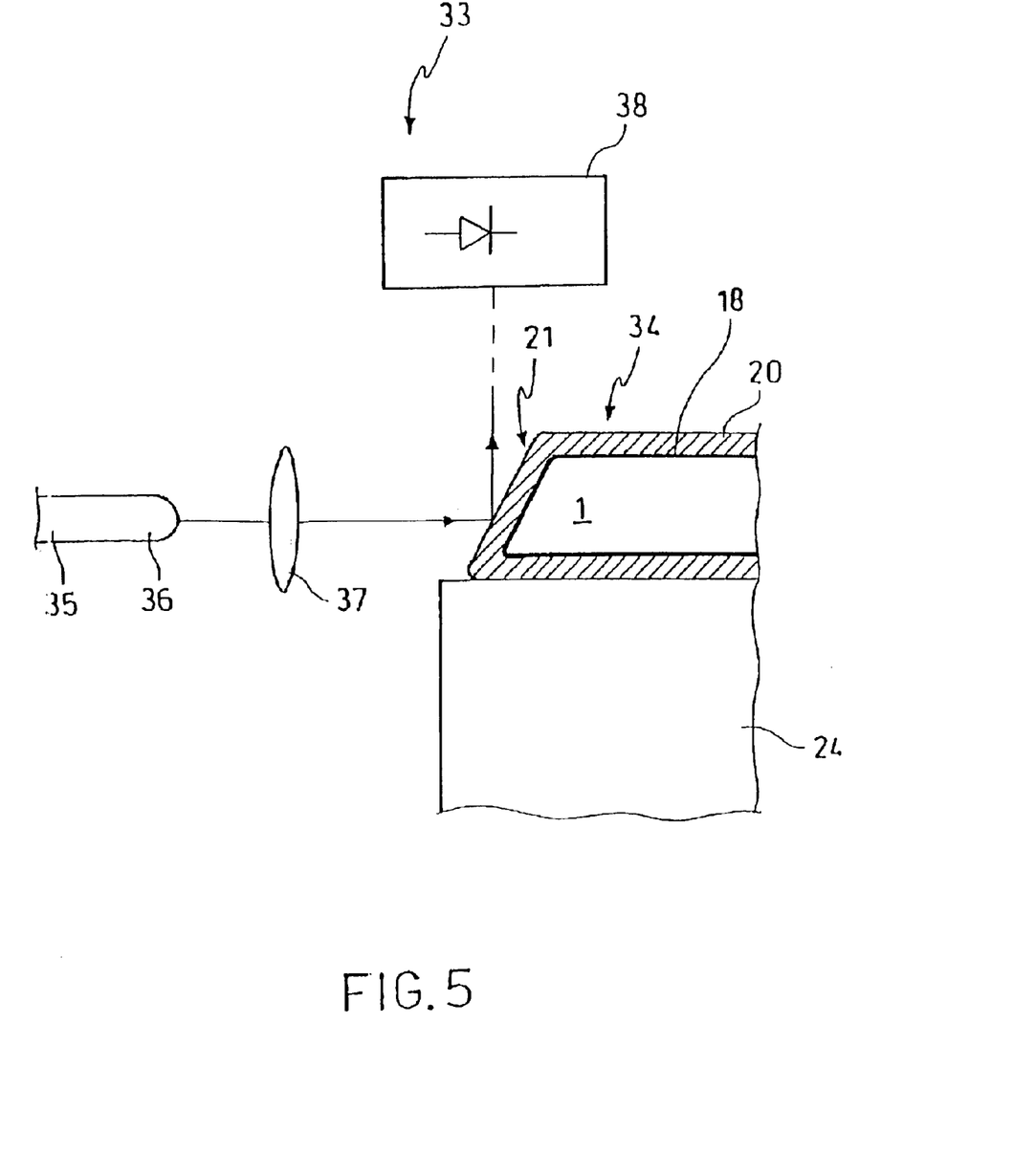
FIG. 5 shows a second embodiment of a system using a second reflecting device obtainable with the method of FIGS. 1a,–1c, 2, 3a–3c in accordance with an embodiment of the invention.

FIG. 5 shows an optical system 33 usable in the field of telecommunications where a reflecting device 34, similar to the device 23 described previously, but comprising only one mirror wall 21, is used. For example, the optical system 33 is placed in the receiving station of an optical telecommunications system.

The optical system 33 comprises an optical fiber 35 connected, by means of a lens 37, to the mirror wall 21 of the reflecting device 34 and a receiving device 38, such as a photodiode. The optical fiber 35, such as a conventional step index, is suitable to propagate optical information signals. For example, said signals are comprised in optical fiber attenuation windows; in other words, they have a wavelength ranging between 800–900 nm, 1250–1350 nm or 1500–1550 nm.

Furthermore, the optical fiber 35 has one end 36 suitably machined to avoid reflection of the outgoing light.

During operation, the light output from the end 36 of the optical fiber 35 hits the mirror wall 21 and is reflected towards the photodiode 38. The photodiode 38, based on the light received, generates a detected electrical signal which carries the information transported by the optical signal propagated in the fiber 35.

To satisfy contingent and specific requirements, one of skill in the art can make further modifications and variations to the method and optical systems according to this invention, all falling within the spirit and protection scope of this invention, as defined in the following claims.

What is claimed is:

1. Device to reflect electromagnetic radiation comprising:

a silicon substrate having a use surface, a layer of material suitable to reflect radiation and placed on said use surface, said layer of material defining, with the use surface, a mirror wall for the reflection of radiation, characterized in that the silicon substrate is of the type <110> and that the mirror wall is substantially parallel to planes {100} of the silicon substrate.

2. Device according to claim 1, further comprising a layer of protection material placed at least on said mirror wall and transparent to said radiation to be reflected.

3. Device according to claim 1, further comprising a silicon support substrate on which said silicon substrate is fixed.

4. A semiconductor structure, comprising:

a <110> type silicon substrate having a first reflective surface that is substantially parallel to the {100} planes of the substrate.

5. The semiconductor structure of claim 4 wherein the substrate has a second reflective surface that is spaced apart from and substantially parallel to the first reflective surface.

6. The semiconductor structure of claim 4, further comprising:

a support substrate, wherein the silicon substrate is mounted to the support substrate.

* * * * *